Dec. 29, 1970          G. A. WATSON          3,551,256
APPARATUS FOR MAKING A MULTISEGMENTED FILTER
Original Filed Nov. 21, 1963
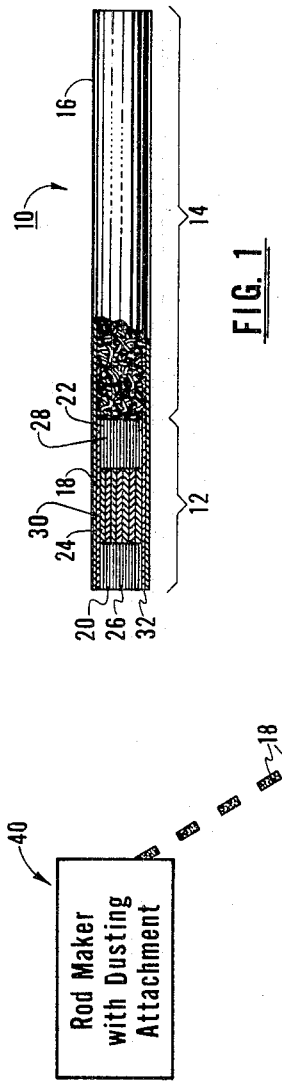
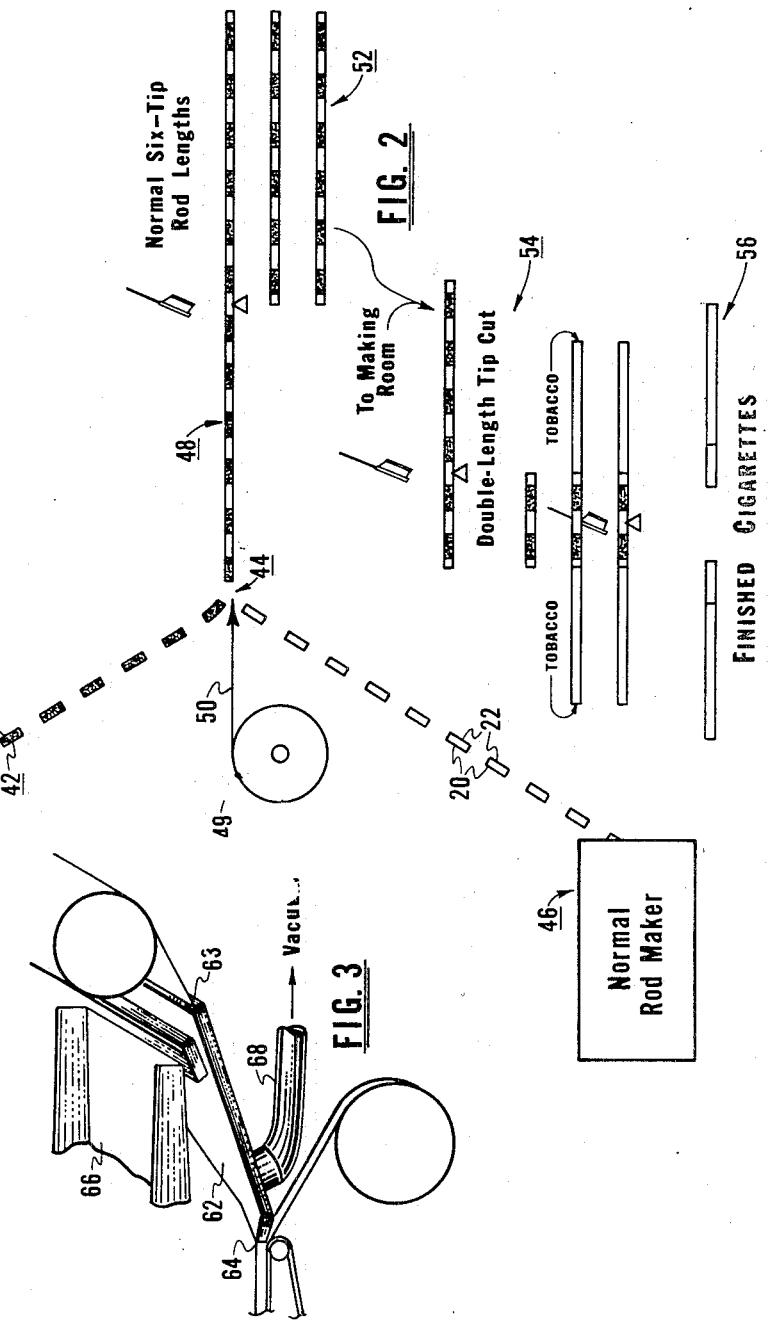
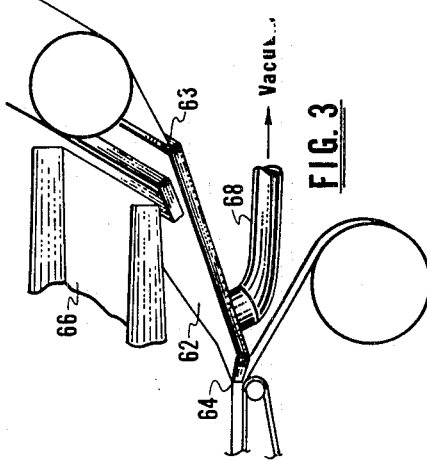
INVENTOR
George A. Watson
BY
AGENT

United States Patent Office 3,551,256
Patented Dec. 29, 1970

3,551,256
APPARATUS FOR MAKING A MULTI-SEGMENTED FILTER
George A. Watson, Charlotte, N.C., assignor to Celanese Corporation, a corporation of Delaware
Original application Nov. 21, 1963, Ser. No. 325,255. Divided and this application Apr. 25, 1967, Ser. No. 661,484
Int. Cl. A24c 5/56
U.S. Cl. 156—441      8 Claims

ABSTRACT OF THE DISCLOSURE

An apparatus is described for use in forming a multi-segmented filter at least a portion of the segments of which have solid particles freely associated therein.

---

This application is a division of co-pending application Ser. No. 325,255, filed Nov. 21, 1963, now abandoned.

This invention relates to the treatment of filamentary and other fibrous materials for use as filtering media and is particularly concerned with the production of improved tobacco-smoke filters especially useful in the manufacture of filter-tip cigarettes.

Filters for cigarettes may be comprised of any of numerous substances. Most frequently, however, filamentary materials such as various synthetic fibers and other fibrous materials such as crepe paper are utilized for this purpose. A generally preferred cigarette filter is formed of a multiplicity of filaments arranged in essentially longitudinal alignment, with substantially all of such filaments extending continuously from one end to the other end of the filter.

In one conventional process for the production of a filter of this latter type, a tow or bundle of several thousand crimped continuous filaments is passed through an air spreader to spread the tow into a flat band. The tow is treated to effect opening or deregistry of the crimps of adjacent filaments. If desired, a suitable plasticizer may be applied to the opened tow, whereafter the treated tow is condensed in cross-sectional area to essentially that of the cigarettes into which the resulting filter tips are to be incorporated. Such condensed tow is then appropriately wrapped in paper and/or bonded by heating in order to provide a unitary continuous filter-rod stock that can be subsequently cut or severed as required to provide the desired filter tips.

Unfortunately, such fibrous-base filters, as commercially produced, do not always exhibit entirely equivalent action and efficiency when filter-tip cigarettes embodying the same are smoked. This irregularity, which may occur even among filters from a single production run, may show itself in any of several ways including specifically non-uniform darkening of the outer end of any given filter tip. Such effect is indicative of the uneven passage of the smoke through the filter and is largely due to channeling of the smoke by the filter, such channeling resulting in a concomitant decrease in the effectiveness of the filter tip in removing or separating undesired components from the tobacco smoke.

From time to time proposals have been advanced with the view of overcoming or at least mitigating to some extent such "channeling" disadvantage as well as related or similar difficulties. A common feature of many of such proposals is the incorporation within the body of the filter tip of some sort of a solid material, generally of an absorptive nature, in finely divided form. For this purpose various types of carbon powder including powdered charcoals from widely differing sources have generally been considered the most desirable.

The presence of such finely divided solid particles has heretofore been considered to require that a plasticizer or other bonding agent also be included in the filter tip during its manufacture in order not only to insure that the powdered solid be more or less firmly secured in place within the filter tip during its manufacture but also to prevent dislodgment of such solid particles during transportation and/or use of cigarettes embodying such filter tips. Thus as will be appreciated, not only does this necessity of employing a bonding agent make it mandatory to provide suitable equipment to properly apply the bonding agent to the filter tip material during its treatment; but the expense of such bonding agent and the consequent overall apparatus for applying the same to the filter-tip material, as well as the additional processing step thereby involved, significantly adds to the unit cost of the resulting filter tips.

What appears to be an obvious and simple solution to such problem is to eliminate the plasticizer or other bonding agent altogether so that, in effect, there is a "free association" between the finely divided solid particles and the filter-tip base or support material. It will be at once clear, however, that even though a filter-rod stock can be continuously formed from such a "dusted" filter-tip base material and then cut into lengths appropriate for use as filter tips, not only would there be an undesirable loss of powdered solid during the consequent production of the filter-tip cigarettes, but the finely divided solid would readily separated from a filter tip during use and enter the mouth of the smoker to the considerable annoyance of the latter.

It would also appear feasible to resolve such situation by forming a "dual" filter tip from such a "dusted" filter-tip base material, that is, a filter tip composed of a first element derived from a filter-tip base material containing freely associated solid particles and joined to a second element derived from a separate filter-tip base material having no solid particles freely associated therewith, and then incorporating such "dual" filter tip into a cigarette with the first element adjacent the tobacco column. While the annoyance to the smoker would thus be eliminated, there would still remain the difficulty due to less of powdered solid at least during production of the filter-tip cigarettes themselves. Such loss would include, of course, that which would result from the severing, in the customarily accepted procedure for producing filter-tip cigarettes, of the continuous filter-rod stock through only the "dusted" elements in order to provide a double-length filter tip to be joined at its opposite ends to two columns of tobacco. In addition, since the "dusted" element on each end of such double-length filter tip would be open, there would be further loss of solid particles that would not only result in contamination of the cigarette-making apparatus but would also produce an unacceptably high proportion of cigarettes subject to rejection because of discoloration or some other esthetic reason.

It will be readily apparent, therefore, that the avoidance of these difficulties—or as many as can be effectively eliminated simultaneously—is greatly to be desired. Accordingly, it is the primary object of the present invention to provide an improved filter, together with a method of and an apparatus for making the same, whereby such difficulties are effectively prevented from arising to any appreciable or significant extent and are thus eliminated for all practical purposes.

An additional object of the invention is to provide a cigarette having a filter tip formed from such a filter and a method of making such a filter-tip cigarette.

Another object of the invention is to provide a unique method of and an apparatus for incorporating finely divided solid particles into a longitudinally advancing tow, with the view, inter alia, of utilizing the resulting treated tow in the production of the improved filters and filter-tip cigarettes provided by the invention.

Other objects and further advantages of the invention will be apparent from the following detailed description of such invention and from the appended claims.

The indicated objects of the invention are essentially attained in a filter formed from a plurality of filtering elements or segments, at least one of which is provided with finely divided solid particles freely associated therewith, such plurality of filtering elements being so combined that loss of such freely associated solid particles from the filter per se is effectively and substantially prevented.

As will be readily evident, such multisegmented filter may be utilized to remove undesired components from a gaseous mixture brought into contact therewith; and for this purpose it is generally desirable that the filter comprise three or more filtering elements, combined so that they are arranged in longitudinal alignment with respect to each other, in order to insure that the desired removal effect is satisfactorily accomplished. Regardless of the number of filtering elements which are so combined, each end filtering element must have substantially no finely divided solid particles freely associated therewith. In this manner, as will be at once appreciated, any troublesome or otherwise significant loss of those finely divided solid particles that are freely associated with the entire filter unit is avoided.

It is by no means essential that all of the filtering elements positioned between the two end filtering elements be provided with freely associated solid particles so long as at least one of such centrally arranged filtering elements has been so treated. As will become apparent, the advantage of the presence of such freely associated solid particles, which can be effectively combined with the filtering element support material in a quantity much greater than would be possible otherwise, is that the efficiency of filtration (or removal of undesired components from the gaseous mixture undergoing treatment) is significantly enhanced.

Where the multisegmented filter of the invention is to be utilized as a filter tip in a cigarette, it has been found that a triple-segmented filter is eminently satisfactory. In such construction, of course, it is only the single filtering element, positioned between the two end filtering elements, that has the finely divided solid particles freely associated therewith.

In any event, regardless of the nature of those filtering elements containing substantially no freely associated particles, each of the other filtering elements comprises in general a fibrous support and finely divided solid particles in free association therewith. While such support may be composed of a fibrous material such as crepe paper or absorbent cotton, for example, it is advantageously composed of a multiplicity of longitudinally aligned, preferably crimped, filaments substantially all extending the full length of the filtering element. The most preferable system, because of the relative ease and simplicity of its production, is that in which each filtering element is composed of a multiplicity of filaments in essentially the manner described above.

It may be desirable in certain instances to employ an appropriate plasticizer or other bonding agent in connection with one or more of those filtering elements having finely divided solid particles freely associated therewith. The amount of any such bonding agent that may be used should be only sufficient, however, to bond some of the solid particles to the filamentary or other fibrous base or support so that there will always be some finely divided solid particles in free association with such support.

A plasticizer or other bonding agent may optionally also be employed in connection with one or more, preferably all of those filtering elements having substantially no freely associated solid particles whether or not a plasticizer is employed in connection with any or all of those filtering elements having solid particles freely associated therewith. In such case the segmented filter may be provided in the desired coherent structure by suitably curing, as by heating, the several plasticized longitudinally aligned filtering elements. A similar coherent mass may be obtained in much the same manner in the absence of a plasticizer if the filamentary or other fibrous material comprising the several filtering elements to be joined is of a nature per se to permit such result. Usually, however, the longitudinally aligned filtering elements comprising the filter per se are surrounded by a wrapper, which is generally made of paper especially in the case of filter-tip cigarette production and which is of sufficient length to enable the desired unitary structure to be provided. An outer wrapper, also desirably of paper, is necessary, of course, in the production of the final filter-tip cigarette in order to insure that the resulting segmented filter is effectively joined to the tobacco column comprising the main portion of the cigarette itself.

Various solid materials that can be appropriately subjected to fine subdivision may be utilized as sources of the freely associated solid particles described above, such as wax, starch, solid polyethylene glycol, silica gel, or any of the other additives disclosed in the prior art. Particulate carbon of various types is preferably employed for this purpose, however, and carbon black, granular charcoal and powdered charcoal have been found especially suitable. Advantageously, the finely divided solid particles are sized so that, on the average, substantially all of such particles pass through about a 10-mesh screen. There is substantially no lower limit to the particle size, the invention having been practiced successfully with powdered charcoal of which 90% passes through a 325 mesh screen (U.S. standard sieve series).

The ratio of the weight of freely associated solid particles to the weight of the filamentary or other fibrous support in a filtering element having solid particles freely associated therewith does not appear critical so far as is known. It is nevertheless possible without any unusual difficulty to have such freely associated solid particles present in an amount on the order of up to about 250% by weight of the filamentary support, a result which can readily be accomplished by means of the hereinafter-described procedure for incorporating finely divided solid particles in free association with a multifilament tow. Moreover, it appears that even significantly higher weight ratios of freely associated solid particles to the filamentary support can be achieved if desired.

In any event it will be appreciated that the indicated weight ratio of about 250% represents an amount of added solid particles materially greater than that which can be normally incorporated into a cigarette filter tip under current and/or usual commercial practice. Generally speaking, in the practice of the present invention, the particular amount of solid particles such as powdered carbon that is combined in free association with the filamentary or other fibrous base or support of the filtering element will be determined—with the necessary appropriate variations to satisfy specific circumstances—not only with regard to whether solely a support having a fixed denier per filament and a fixed total denier is to be used but also with regard to whether there are available several different supports having various combinations of denier per filament and total denier. Moreover, as the total denier is decreased, in general it becomes possible to increase the amount of solid particles freely associated with the filamentary support and thereby to provide a correspondingly greater weight ratio. As will be understood in this connection, the denier per filament and the total denier, regardless of the amount of freely associated solid particles present, constitute factors which influence, inter alia, the efficiency of the resulting segmented filter in removing undesired components from a gaseous mixture contacted therewith and the extent of the pressure drop through the filter, a feature of special importance with respect to filter-tip cigarettes.

As already indicated, each filter element having solid particles freely associated therewith—and the other filtering elements as well—are desirably multifilamentous in nature. Advantageously, these filaments are comprised of an organic derivative of cellulose including particularly cellulose esters such as cellulose acetate, cellulose propionate, cellulose acetate propionate, and highly esterified cellulose such as cellulose triacetate containing less than 0.29 free hydroxy group per anhydroglucose unit. Of the several cellulose esters it is usually preferred to employ cellulose acetate for the present purpose. Other filamentary materials including rayon (regenerated cellulose), linear superpolyamides such as nylon-6 and nylon-66, linear polyesters, and polymers and copolymers of vinylidene compounds such as olefins, e.g., ethylene or propylene, acrylonitrile, vinylidene chloride or vinylidene cyanide, and vinyl chloride may also be employed.

The denier per filament in each filtering element or segment and the total denier of the filaments in each such segment may vary within relatively wide limits. Ordinarily, however, especially in the preparation of filters for incorporation into cigarettes of conventional cross section, i.e., cigarettes having a periphery of about 25 to 26 mm., the denier per filament in each segment will range from about 1 to 50 and preferably from about 1.5 to 10, and the total denier of the filaments in each segment will range from about 20,000 to 160,000 and preferably from about 20,000 to 80,000. An interesting feature of the present invention is that it permits the use of tows of a total denier considerably lower than would be suitable if no solid additive were on the tow.

Similarly, the number of filaments comprising a given filtering element or segment may vary extremely widely. In the case of the conventional cigarettes mentioned above, however, the number of filaments in each segment will be at least several thousand and will usually vary from about 5,000 to 30,000.

The number of crimps per inch in the filaments in a given segment may range as high as about 20. Preferably, however, the number of crimps per inch will average from about 4 to 12.

A plasticizer, when employed, will be selected, of course, according to the nature of the filaments making up the fibrous support in any given filtering element or segment. When the preferred cellulose acetate filaments are used, the plasticizer may be triethyl citrate, dimethoxy ethyl phthalate, or methyl phthalyl ethyl glycolate among others; desirably, however, glycerol triacetate (triacetin) is employed. Ordinarily, about 2 to 30% by weight of the plasticizer on the basis of the filamentary support— and preferably about 4 to 15%—will be applied to the filaments of such support.

Where the segmented filter is to be utilized in the production of a filter-tip cigarette of the usual type, the several filtering elements, formed as right cylinders each having an essentially circular cross section, are arranged in axial alignment and wrapped or otherwise combined into a unitary structure; such segmented filter is abutted in axial alignment against one end of a substantially cylindrical column of tobacco of basically the same cross section; and a suitable paper wrapper is applied to such combination in order to join the two abutting parts together.

The invention will now be described in more detail with reference to the accompanying drawings, in which:

FIG. 1 is an elevation, partly in cross-section, of a cigarette provided with a triple-segmented filter tip according to the invention;

FIG. 2 is a schematic elevation of an arrangement for forming triple-segmented filters and cigarettes incorporating the same as filter tips; and FIG. 3 is a view, partly in elevation and partly in perspective, of an apparatus for incorporating finely divided solid particles into a longitudinally advancing multifilament tow in accordance with the invention.

As shown in FIG. 1, the present filter-tip cigarette, indicated generally at 10, comprises essentially a triple-segmented filter 12 forming the filter tip and a column 14 of tobacco in end-to-end abutment with such filter. Filter 12 and column 14, both being substantially cylindrical and having essentially similar circular cross sections and both having been assembled in axial alignment, are maintained in such relationship for use by a smoker by means of a suitable paper wrapper 16 extending the entire length of such assembly.

The segmented filter tip 12, as explained above, comprises the filtering element 18 centrally positioned between the two end filtering elements 20 and 22, all three elements being substantially cylindrical in form and being arranged in axial alignment with each other. Each filtering element is composed of a multiplicity of longitudinally aligned filaments 24, 26, and 28 respectively with such filaments in each case being advantageously comprised of cellulose acetate. Freely associated with the filaments 24 of element 18 are finely divided solid particles 30, which preferably comprise powered carbon in a form such as carbon black. The two end filtering elements 26 and 28 do not include any solid particles in free association with their respective filaments. If desired, a suitable plasticizer such as triacetin may be combined with the filaments in each element, with the amount of plasticizer in the central element 18 being so limited that only a few or some of the solid particles are thereby bonded to the filaments 24 and the balance remain in their freely associated relation with respect to the filamentary support.

Being prepared separately, the triple-segmented filter tip 12 is provided with its own wrapper 32, also made of paper, in order to form a unitary structure that can be conveniently manipulated by conventional equipment for manufacturing cigarettes provided with filter tips. It will be appreciated that, as indicated, the "outer" overall wrapper 16 surrounds and covers over the "inner" wrapper 32.

The filter-tip cigarette shown in FIG. 1 may be conveniently produced by the arrangement schematically shown in FIG. 2. Generally indicated at 40 is a device for continuously forming a rod stock comprising finely divided solid particles, for example, carbon black, in free association with substantially longitudinally aligned filaments, for example, cellulose acetate filaments, and severing such rod stock into the individual filtering elements 18. Although any apparatus that will appropriately combine finely divided solid particles in free association with a filamentary or other fibrous tow that is being longitudinally advanced at the point or zone of combination of the solid particles therewith may be employed in carrying out the present invention, the specially designed apparatus shown in FIG. 3 and described in more detail hereinafter is greatly to be preferred. The above-mentioned rod stock is desirably provided with a suitable wrapper as it is being formed so that the resulting individual filtering elements 18 are each provided with a wrapping 42 to aid in preventing loss of freely associated solid particles as the elements 18 are being transferred to the zone, generally indicated at 44, for combination with the filtering elements 20 and 22 which have no solid particles in free association therewith and which are being simultaneously produced by the separate rod stock-making device generally indicated at 46. (It will be appreciated, of course, that the central filtering element 18 shown in FIG. 1 is provided with the wrapping 42 even though, in the interest of clarity, the latter has been omitted from FIG. 1.)

Separate device 46 may comprise any suitable apparatus that will appropriately form a longitudinally advancing tow into a continuous rod stock and that includes means for severing such latter rod stock to form the individual filtering elements 20 and 22. As will be apparent from the preceding description, this separate longitudinally advancing tow may also be composed of a multitude of substantially longitudinally aligned continuous filaments which may similarly comprise cellulose acetate and which have desirably been crimped. In addition, as is also apparent from the foregoing description, this separate tow should have substantially no finely divided solid particles freely associated therewith.

The cross-sectional area of the rod stock produced by the separate device 46, as will be appreciated, should be essentially the same as that of the freely associated solid particle-containing rod stock produced by the device 40 in order that the continuous filter rod stock, generally indicated at 48, may itself be substantially uniform in cross section. Moreover, while the severed filtering elements 18 and the separately severed filtering elements 20 and 22 may have any desired or predetermined length, it is advantageous to provide the two different filtering elements in the same length in order to facilitate subsequent separation of the ultimate triple-segmented filter tips from the continuous filter rod stock 48.

It should be noted in this connection that the tow treated in device 40 is desirably longitudinally advanced therethrough in opened condition and that the finely divided solid particles are introduced thereinto under conditions such that, if desired, part of such solid particles may be bonded or otherwise adhered to the filamentary or other fibrous tow, with the remainder of such solid particles maintaining a free association with the tow. To effect such limited bonding of the solid particles, as has already been described, a plasticizer or other bonding agent in restricted amount if suitably added to the advancing tow. It will also be appreciated that, being opened, this tow is necessarily condensed, following its combination with the solid particles, to form the previously described rod stock, which, of course, has a substantially reduced cross-sectional area.

The continuous filter rod stock 48 is formed at zone 44 by combination of the two different filtering elements 18 and 20, 22 in any desired sequence, with the necessary precautions being taken that the resulting combined filtering elements are arranged in longitudinal alignment. In general, at least one of the elements 18 should always be positioned between two of the elements 20, 22. Where, however, it is desired to produce a triple-segmented cigarette filter tip, when the two different elements are merely altered. Provision is desirably made at 49 to surround the filter rod stock as it is being formed with a second wrapper 50, which, in the case of the triple-segmented filter tip, becomes the "inner" wrapper 30.

To obtain usable segmented filters from the filter rod stock, it is, of course, necessary to cut or sever the same. In order to avoid contamination of any equipment such as a cigarette-making machine by loss or other separation of the freely associated solid particles from the filter rod stock as it is being severed, the cutting of the same is so synchronized that severing occurs only at selected filtering elements having no freely associated solid particles. In this manner segmented filter lengths in which each end portion has substantially no freely associated solid particles are obtained.

To form triple-segmented filter-tip cigarettes from the filter rod stock 48 when it contains the two different filtering elements in the previously mentioned alternate arrangement, such filter rod stock is initially cut, in the manner already indicated, to provide shorter lengths containing an even number of the ultimately desired triple-segmented filters. Usually such shorter length contains six triple-segmented filter tips, as generally shown at 52. Such shorter lengths are then cut as necessary to provide double-length triple-segmented filters as indicated generally at 54. Thereafter, in accordance with customary practice as generally shown at 56, each such double-length filter is axially aligned at its opposite ends with two tobacco columns; the combination is wrapped in order to join the several parts together; and the resulting filter-tip cigarettes are severed from each other by cutting through the previously uncut filtering element having substantially no freely associated solid particles.

It will be appreciated that, when the indicated procedure is followed, there is substantially no possibility for contamination of the cigarette-making equipment or similar machinery and that the probability of discoloration of cigarettes due to escaping freely associated solid material is eliminated for all practical purposes.

The apparatus shown in FIG. 3 represents a preferred arrangement for incorporating finely divided solid particles with a multifilament tow in order to accomplish the purpose previously described in connection with device 40 of FIG. 2. Essentially such apparatus includes an enclosed treating chamber 62, into one end 63 of which the opened tow is longitudinally advanced and from the opposite end 64 of which the tow is longitudinally withdrawn in condensed form. At the tow-entrance end provision is made at 66 for introducing finely divided solid particles into the chamber for initial distribution among the filaments of the tow; and at the tow-withdrawal end provision is made at 68 for applying a vacuum to the chamber for the purpose of achieving substantially uniform distribution of the solid particles among the filaments as the tow passes through the chamber and is condensed or consolidated to the desired rod-stock form. In addition, any excess solid particles are removed by the vacuum effect that is created. More importantly, it has been found that unusually large amounts of solid particles may thus be combined with a longitudinally advancing filamentous tow.

In one particular form of this apparatus the treating chamber 62 has a flattened funnel shape, with the opened tow being advanced into the chamber at its wide end and with the condensed tow being withdrawn from the chamber at its opposite narrow end. Desirably, such funnel-shaped chamber is arranged substantially horizontally, with the means 66 for introducing the solid particles into the chamber being positioned at its top side and with the means 68 for applying the vacuum to the chamber being positioned at its under side.

The invention will be further illustrated with reference to the following examples wherein all parts are by weight unless otherwise specified.

EXAMPLES I–VIII

In the following examples a secondary cellulose acetate tow made up of 9,600 filaments each of 5 denier and regular cross-section (total denier 48,000) is opened and made up into continuous cigarette filter rods of 25 mm. circumference, the weight of tow in a filter tip of 17 mm. being 0.1325 gram. In making the filter rods in some runs solid carbon particles are applied to the opened tow prior to wrapping with paper in the manner illustrated in FIG. 3. (12 x 30 ASC carbon, for example, has reference to a carbon supplied by Pittsburgh Coke and Carbon Company, all of the material passing through a 12 mesh screen and being retained by a 30 mesh screen. BPL has reference to another type of carbon also supplied by Pittsburgh Coke and Carbon Company). In some examples triacetin is applied as a plasticizer to the extent indicated. Cigarettes are smoked through the filter under standard conditions and the pressure drop across the plug is determined expressed in mm. of water. The smoke after passing through the filter tip passes through the trap which absolutely removes all non-gaseous materials from the smoke. The total potential filterable solids is the sum of the increases in weight of the filter tip and of the trap and averages about 0.244 gram for a 17 mm. tip. The smoke removal efficiency is the percentage of total filterable solids which is removed by the tip. The results for 17 mm. tips are set forth in the following table:

| | Tip weight, gms. | Gram of carbon | Percent plasticizer | Pressure drop, mm. H$_2$O | Tip weight gain, gm. | Trap weight gain, gm. | Smoke removal efficiency |
|---|---|---|---|---|---|---|---|
| I. Control, nonplasticized | 0.1325 | 0 | 0 | 27 | 0.076 | 0.145 | 34 |
| II. Control, plasticized | 0.1414 | 0 | 8 | 27 | 0.081 | 0.149 | 35 |
| III. 12 x 30 ASC carbon | 0.2455 | 0.1041 | 8 | 45 | 0.085 | 0.138 | 38 |
| IV. 12 x 30 ASC carbon | 0.2498 | 0.1173 | 0 | 52 | 0.112 | 0.142 | 44 |
| V. 12 x 30 BPL carbon | 0.2234 | 0.0820 | 8 | 44 | 0.104 | 0.132 | 44 |
| VI. 12 x 30 BPL carbon | 0.2311 | 0.0986 | 0 | 53 | 0.119 | 0.130 | 48 |
| VII. 30 x 140 ASC carbon | 0.2428 | 0.1014 | 8 | 62 | 0.123 | 0.114 | 52 |
| VIII. 30 x 140 ASC carbon | 0.2153 | 0.0828 | 0 | 59 | 0.139 | 0.119 | 54 |

Further tests with unplasticized filters containing .0825 gram of 30 x 140 BPL carbon per 17 mm. tip indicate the tip passes only 9.0 micrograms of phenol per cigarette smoked which compares favorably with carbon-free plugs containing the plasticizer triacetin which is known to be selective in removing phenol.

It is to be understood that the foregoing detailed description is given merely by way of illustration and that many variations may be made therein without departing from the spirit of my invention.

The embodiments of the invention in which an exclusive property or privilege is claimed are defined as follows:

1. Apparatus for making a segmented filter adapted for the removal of undesired components from a gaseous mixture to be contacted therewith, which comprises (1) means for combining finely divided solid particles and a longitudinally advancing opened fibrous tow under conditions such that at least some of said solid particles remain freely associated with said tow, said means include a vacuum source for substantially uniformly distributing said solid particles within said opened fibrous tow, therein permitting amounts of up to 250 percent by weight of solid particles to fibrous material to be obtained, means for thereafter forming the opened fibrous tow into a first continuous rod stock of substantially reduced cross-sectional area, and a device for severing such rod stock into individual filtering elements of predetermined length; (2) second means for forming a separate longitudinally advancing tow, which has substantially no finely divided solid particles freely asssociated therewith, into a second continuous rod stock having a cross-sectional area essentially the same as that of said first rod stock, and a second device for severing such second rod stock into individual filtering elements of predetermined length; (3) means for combining the resulting two different filtering elements in longitudinal alignment into a continuous filter-rod stock in such a manner that at least one of said elements having freely associated solid particles is always positioned between two of said elements having substantially no freely associated solid particles; and (4) a third device for severing said filter-rod stock at only selected filtering elements having substantially no freely associated solid particles to form segmented filters in which each end portion has substantially no freely associated solid particles.

2. Apparatus according to claim 1, which includes means for applying a bonding agent to the opened fibrous tow in an amount sufficient to bond only some of the solid particles to the tow.

3. Apparatus according to claim 1, which includes means for wrapping the first continuous rod stock prior to its severance into filtering elements.

4. Apparatus according to claim 3, which includes separate means for wrapping the continuous filter-rod stock as the two different filtering elements are being combined thereinto.

5. Apparatus for incorporating finely divided solid particles with a multifilament tow, which comprises an enclosed treating chamber, means for longitudinally advancing the tow in opened form into one end of said chamber, means for longitudinally withdrawing the tow in condensed form from the opposite end of said chamber, means for introducing finely divided solid particles into said one end of the chamber for initial distribution among the filaments of the advancing opened tow, and means for applying a vacuum to the chamber at said opposite end to achieve substantially uniform distribution of solid particles among the advancing tow filaments therein permitting amounts of up to 250 percent by weight of solid particles to fibrous material to be obtained.

6. Apparatus according to claim 5, in which the enclosed treating chamber has a flattened funnel shape, the means for advancing the opened tow into said chamber being positioned at its wide end, and the means for withdrawing the condensed tow being positioned at its opposite narrow end.

7. Apparatus according to claim 6, in which the funnel-shaped chamber is arranged substantially horizontally, the solid particle-introducing means is positioned at the top side of said chamber, and the vacuum-applying means is positioned at the under side of the chamber.

8. Apparatus according to claim 5, which includes means to apply a bonding agent to the longitudinally advancing tow in an amount sufficient to bond to the filaments only some of the solid particles introduced into and remaining within the treating chamber.

References Cited
UNITED STATES PATENTS

| | | | |
|---|---|---|---|
| 2,979,058 | 4/1961 | Schur | 131—94X |
| 3,016,945 | 1/1962 | Wexler | 156—441X |
| 3,052,164 | 9/1962 | Rowlands | 131—94X |
| 3,079,978 | 3/1963 | Cobb et al. | 156—441X |
| 3,094,128 | 5/1963 | Dearsley | 131—94 |
| 3,095,343 | 5/1963 | Berger | 156—441X |
| 3,106,501 | 10/1963 | Cobb et al. | 156—180 |
| 3,238,852 | 3/1966 | Schur et al. | 93—1c |

BENJAMIN R. PADGETT, Primary Examiner

G. SOLYST, Assistant Examiner

U.S. Cl. X.R.

131—35; 156—180, 296